(12) United States Patent
Kulkarni

(10) Patent No.: US 11,539,782 B2
(45) Date of Patent: Dec. 27, 2022

(54) CONTROLLING CAN COMMUNICATION IN A VEHICLE USING SHIFTING CAN MESSAGE REFERENCE

(71) Applicants: Hyundai Motor Company, Seoul (KR); Kia Motors Corporation, Seoul (KR)

(72) Inventor: Ashwin Kulkarni, Superior Township, MI (US)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 861 days.

(21) Appl. No.: 16/149,437

(22) Filed: Oct. 2, 2018

(65) Prior Publication Data

US 2020/0106826 A1    Apr. 2, 2020

(51) Int. Cl.
*H04L 67/025* (2022.01)
*H04L 67/00* (2022.01)
(Continued)

(52) U.S. Cl.
CPC ............ *H04L 67/025* (2013.01); *H04L 67/34* (2013.01); *H04L 2012/40215* (2013.01); *H04L 2012/40273* (2013.01); *H04L 2101/627* (2022.05)

(58) Field of Classification Search
CPC .................. H04L 67/025; H04L 67/34; H04L 2012/40273; H04L 2012/40215;
(Continued)

(56) References Cited

U.S. PATENT DOCUMENTS

| 10,218,499 B1* | 2/2019 | El Idrissi ............... H04L 9/0819 |
| 2008/0127056 A1* | 5/2008 | Java ........................ G06F 8/427 |
| | | 717/106 |

(Continued)

FOREIGN PATENT DOCUMENTS

| CN | 106844611 A | * | 6/2017 |
| CN | 106844611 A | | 6/2017 |

(Continued)

OTHER PUBLICATIONS

Vector, DBC File Format Documentation Version 1.0.5, 2008 (Year: 2008).*

(Continued)

*Primary Examiner* — Emmanuel L Moise
*Assistant Examiner* — Robert A Shaw
(74) *Attorney, Agent, or Firm* — Fox Rothschild LLP

(57) ABSTRACT

A method for controlling controller area network (CAN) communication in a vehicle including a plurality of electronic control units (ECUs) and a plurality of CAN databases accessible by the plurality of ECUs can include: storing CAN message information in the plurality of CAN databases such that each CAN database stores a unique configuration of the CAN message information; establishing a plurality of periodic intervals; and when a subsequent interval among the plurality of periodic intervals begins: receiving a plurality of measurement values deriving from a plurality of sensors equipped in the vehicle, calculating a database reference number based upon the plurality of measurement values, the database reference number newly identifying a particular CAN database among the plurality of CAN databases, and performing CAN communication, by each ECU, based upon the uniquely configured CAN message information stored in the newly identified CAN database.

18 Claims, 5 Drawing Sheets

(51) Int. Cl.
H04L 12/40 (2006.01)
H04L 101/627 (2022.01)

(58) Field of Classification Search
CPC ............... H04L 12/40; H04L 12/40078; H04L 12/40104; H04L 63/1416; H04W 4/48; G05B 23/0213; G05B 2219/24065
See application file for complete search history.

(56) References Cited

U.S. PATENT DOCUMENTS

| | | | | |
|---|---|---|---|---|
| 2008/0186870 | A1* | 8/2008 | Butts | H04L 43/0847 370/252 |
| 2010/0215043 | A1* | 8/2010 | Hisada | H04L 12/40 370/392 |
| 2010/0256860 | A1* | 10/2010 | Yamada | G01M 17/00 701/29.6 |
| 2011/0137955 | A1* | 6/2011 | Sul | H04L 43/50 707/E17.044 |
| 2012/0215754 | A1 | 8/2012 | Marzani et al. | |
| 2013/0064372 | A1 | 3/2013 | Delport et al. | |
| 2013/0227650 | A1* | 8/2013 | Miyake | H04L 63/08 726/3 |
| 2014/0121891 | A1* | 5/2014 | Barrett | G07C 5/008 701/33.2 |
| 2014/0126719 | A1* | 5/2014 | Kawamura | G07C 9/00817 380/44 |
| 2014/0142801 | A1 | 5/2014 | Shah | |
| 2014/0232521 | A1* | 8/2014 | Kawamura | G07C 9/20 340/5.26 |
| 2014/0310359 | A1* | 10/2014 | Kim | H04L 41/0893 709/206 |
| 2014/0328352 | A1* | 11/2014 | Mabuchi | H04L 12/4035 370/451 |
| 2015/0215125 | A1* | 7/2015 | Park | H04L 63/1466 380/255 |
| 2016/0173513 | A1* | 6/2016 | Rohde | H04L 12/4625 726/23 |
| 2017/0013005 | A1* | 1/2017 | Galula | H04L 63/1425 |
| 2017/0070488 | A1* | 3/2017 | Jun | H04W 12/041 |
| 2017/0132534 | A1 | 5/2017 | Darnell et al. | |
| 2018/0062988 | A1* | 3/2018 | Sikaria | H04L 69/22 |
| 2018/0115575 | A1* | 4/2018 | Hartkopp | H04L 63/1425 |
| 2018/0196941 | A1* | 7/2018 | Ruvio | G06F 13/364 |
| 2018/0217953 | A1* | 8/2018 | Cross | G01M 17/00 701/29.6 |
| 2018/0219872 | A1* | 8/2018 | Sugashima | H04L 9/3242 |
| 2018/0234498 | A1* | 8/2018 | Sangameswaran | H04L 43/0847 370/252 |
| 2018/0295112 | A1* | 10/2018 | Coppola | H04L 12/4625 726/23 |
| 2018/0365094 | A1* | 12/2018 | Sonalker | H04L 9/3242 |
| 2019/0258727 | A1* | 8/2019 | Schmotzer | G01M 17/00 701/29.6 |

FOREIGN PATENT DOCUMENTS

| | | | | |
|---|---|---|---|---|
| CN | 107132832 A | * | 9/2017 | |
| CN | 107749845 A | * | 3/2018 | |
| CN | 107948176 A | * | 4/2018 | ............ G01N 33/50 |
| DE | 10127963 A1 | * | 1/2003 | ......... G05B 19/0426 |
| KR | 1544887 B1 | * | 8/2015 | ............ H04L 41/00 |
| WO | WO-2012107346 A1 | * | 8/2012 | ............ B60R 25/04 |
| WO | WO-2015091386 A1 | * | 6/2015 | ............ H04L 12/40 |
| WO | WO-2017022821 A | * | 2/2017 | ............ G06F 21/45 |
| WO | WO-2017147207 A1 | * | 8/2017 | ......... H04L 63/0435 |

OTHER PUBLICATIONS

Pimentel et al, "Dependable Automotive CAN Networks" in Automotive Embedded Systems Handbook (Nicolas Navet and Françoise Simonot-Lion, eds.), CRC Press, 2009, chapter 6 (Year: 2009).*
Civelek A Software Tool for Vehicle Calibration, Diagnosis and Test Via Controller Area Network (Year: 2012).*
Wu et al, IDH-CAN: A Hardware-Based ID Hopping CAN Mechanism With Enhanced Security for Automotive Real-Time Applications, IEEE Access, Sep. 17, 2018, (Year: 2018).*
Karray et al, Identifier Randomization: An Efficient Protection Against CAN-Bus Attacks, In: Koç Ç.K. (eds) Cyber-Physical Systems Security. Springer, 2018 pp. 219-254 (Year: 2018).*
CSS Electronics. CAN Bus Sniffer—Reverse Engineering Vehicle Data (Wireshark), https://www.csselectronics.com/screen/page/reverse-engineering-can-bus-messages-with-wireshark/language/en (https://youtu.be/xZNszFTaP0A), Apr. 15, 2018 (Year: 2018).*
U. Civelek, A Software Tool for Vehicle Calibration, Diagnosis and Test via Controller Area Network, MS Thesis, Middle East Technical University, Sep. 2012 (Year: 2012).*

* cited by examiner

CAN DATABASE 1: INTERNAL STRUCTURE

| DATA FIELD | IDENTIFIER (ID FOR THE MESSAGE) | DATA LENGTH CODE (DLC) LENGTH | PAYLOAD BYTE 1 | PAYLOAD BYTE 2 | PAYLOAD BYTE 3 | PAYLOAD BYTE 4 |
|---|---|---|---|---|---|---|
| SPEED | 100 | LENGTH = 2 | 7 | 5 | | |
| TEMPERATURE | 101 | LENGTH = 3 | 1 | 0 | 2 | |
| ENGINE TEMPERATURE | 102 | LENGTH = 3 | 3 | 4 | 6 | |

CAN DATABASE 2: INTERNAL STRUCTURE

| DATA FIELD | IDENTIFIER (ID FOR THE MESSAGE) | DLC LENGTH | PAYLOAD BYTE 1 | PAYLOAD BYTE 2 | PAYLOAD BYTE 3 | PAYLOAD BYTE 4 |
|---|---|---|---|---|---|---|
| SPEED | 102 | LENGTH = 2 | 7 | 5 | | |
| TEMPERATURE | 100 | LENGTH = 3 | 1 | 0 | 2 | |
| ENGINE TEMPERATURE | 101 | LENGTH = 3 | 3 | 4 | 6 | |

FIG. 2

CONTROLLING CAN COMMUNICATION IN A VEHICLE USING SHIFTING CAN MESSAGE REFERENCE

TECHNICAL FIELD

The present disclosure relates generally to controller area network (CAN) communication in a vehicle, and more particularly, to controlling CAN communication in a vehicle using a shifting CAN message reference.

BACKGROUND

Controller area networks, or CANs, are often utilized in vehicles to implement a robust, relatively inexpensive in-vehicle network connecting several electronic control units (ECUs) in charge of controlling certain vehicle functions, such as climate control, vehicle displays (i.e., clusters), infotainment systems, and the like. A typical CAN utilizes a CAN bus which enables the ECUs in the CAN to communicate with each other without a host computer. The ECUs can send and receive data across the CAN bus in packets called frames.

In this regard, FIG. 1 is a diagram illustrating a conventional CAN data frame. The purpose of the CAN data frame is typically to transmit vehicle data, user data, or the like. The CAN data frame is composed of several different components, each designated for performing a particular task, including a start of frame (SOF) bit, an identifier (ID) which sets the priority of the data frame, a remote transmission request (RTR) bit, an Identifier Extension (IDE) bit, a data length code (DLC), a data field, a cyclic redundancy check (CRC) sequence, a delimiter (DEL) bit, an acknowledgement (ACK) bit, and end of frame (EOF) bits. Among these, the payload bytes can be transported in the data field, and the DLC field can communicate the number of payload bytes to the receivers.

Problematically, when ECUs transmit CAN data frames across the network, these communications can be vulnerable to hacking due to the open communication channel utilized in CANs. As such, vehicle CANs can be susceptible to intrusions by hackers who may attempt to read and decode the CAN messages by physically connecting to the CAN bus or using on-board (OBD) ports to access the CAN bus. Then, the hacker can decode or reverse engineer the intercepted data. Hackers can also inject messages on the CAN bus which may trigger system malfunction or misbehavior.

SUMMARY

The present disclosure provides systems and methods for securely controlling controller area network (CAN) communication in a vehicle using a CAN message reference that is shifted at periodic intervals. A plurality of electronic control units (ECUs) and a plurality of CAN databases accessible by the plurality of ECUs can be included in the CAN. Each CAN database can store a unique configuration of CAN message information, defining a CAN message reference, and the ECUs can communicate within the CAN based upon the stored CAN message information. At predefined times, according to the periodic intervals, the ECUs can identify a new CAN database, according to measurement inputs received by a plurality of sensors equipped in the vehicle, and can perform CAN communication based upon the uniquely configured CAN message information stored in the newly identified CAN database. By periodically shifting the CAN message reference upon which CAN communication is based, the CAN may be better equipped to defend against attacks from intruders or hackers, to detect system attacks at an early stage, and to limit any damage in the event of a system breach.

According to embodiments of the present disclosure, a method for controlling controller area network (CAN) communication in a vehicle including a plurality of electronic control units (ECUs) and a plurality of CAN databases accessible by the plurality of ECUs can include: storing CAN message information in the plurality of CAN databases such that each CAN database stores a unique configuration of the CAN message information; establishing a plurality of periodic intervals during which each ECU performs CAN communication based upon the uniquely configured CAN message information stored in a particular CAN database among the plurality of CAN databases; and when a subsequent interval among the plurality of periodic intervals begins: receiving a plurality of measurement values deriving from a plurality of sensors equipped in the vehicle, calculating a database reference number based upon the plurality of measurement values, the database reference number newly identifying a particular CAN database among the plurality of CAN databases, and performing CAN communication, by each ECU, based upon the uniquely configured CAN message information stored in the newly identified CAN database.

The method can further include designating a particular ECU among the plurality of ECUs as a master ECU to control one or more operations of the method for controlling CAN communication, such that the remaining ECUs operate as slave ECUs.

In this regard, the establishing of the plurality of periodic intervals can include defining, by the master ECU, a plurality of database reference number calculation times. Also, the method can further include receiving, at the slave ECUs, the defined plurality of database reference number calculation times from the master ECU; and when a subsequent database reference number calculation time among the defined plurality of database reference number calculation times begins, calculating, by the slave ECUs, the database reference number based upon the plurality of measurement values.

The receiving of the plurality of measurement values can include receiving, at the master ECU only, the plurality of measurement values deriving from the plurality of sensors equipped in the vehicle. Also, the method can further include receiving, at the slave ECUs, the plurality of measurement values from the master ECU; and calculating, by the slave ECUs, the database reference number based upon the received plurality of measurement values.

The calculating of the database reference number can include calculating, by the master ECU only, the database reference number based upon the plurality of measurement values. Also, the method can further include receiving, at the slave ECUs, the calculated database reference number from the master ECU; and performing CAN communication, by each ECU, based upon the uniquely configured CAN message information stored in the CAN database newly identified by the received database reference number.

The receiving of the plurality of measurement values can include receiving, at each ECU, a plurality of measurement values deriving from a plurality of sensors respectively controlled by each ECU such that each ECU receives a unique grouping of measurement values; calculating, by the master ECU only, the database reference number based upon the plurality of measurement values received by the master ECU; transmitting, by the master ECU, the calculated database reference number to the slave ECUs; and performing CAN communication, by each ECU, based upon the uniquely configured CAN message information stored in the CAN database newly identified by the transmitted database reference number.

The method can further include designating, by the master ECU, a particular ECU among the plurality of ECUs as a new master ECU to control one or more operations of the method for controlling CAN communication.

In addition, the receiving of the plurality of measurement values can include receiving, at each ECU, the plurality of measurement values deriving from the plurality of sensors equipped in the vehicle such that each ECU receives a common grouping of measurement values.

The calculating of the database reference number can include calculating, by each ECU, the database reference number based upon the plurality of measurement values.

The database reference number can be a randomly calculated number based on the plurality of measurement values.

The establishing of the plurality of periodic intervals can include establishing the plurality of periodic intervals according to a common time set by a time-keeping device equipped in the vehicle.

In addition, the performing of CAN communication can include receiving, at an ECU among the plurality of ECUs, a CAN message via a CAN bus; and determining, by the ECU, content of the CAN message based upon the uniquely configured CAN message information stored in the newly identified CAN database.

Each unique configuration of the CAN message information can include a unique identification scheme of a plurality of data fields of a CAN message.

Furthermore, according to embodiments of the present disclosure, a system for controlling controller area network (CAN) communication in a vehicle can include: a plurality of electronic control units (ECUs) equipped in the vehicle; a plurality of CAN databases configured to store CAN message information such that each CAN database stores a unique configuration of the CAN message information; a plurality of sensors equipped in the vehicle communicatively coupled to the plurality of ECUs; and a CAN bus through which the plurality of ECUs perform CAN communication. One or more of the plurality of ECUs can be configured to establish a plurality of periodic intervals during which each ECU performs CAN communication based upon the uniquely configured CAN message information stored in a particular CAN database among the plurality of CAN databases, and when a subsequent interval among the plurality of periodic intervals begins: receive a plurality of measurement values deriving from the plurality of sensors, calculate a database reference number based upon the plurality of measurement values, the database reference number newly identifying a particular CAN database among the plurality of CAN databases, and perform CAN communication based upon the uniquely configured CAN message information stored in the newly identified CAN database.

Furthermore, according to embodiments of the present disclosure, a non-transitory computer readable medium containing program instructions for controlling controller area network (CAN) communication in a vehicle including a plurality of electronic control units (ECUs) and a plurality of CAN databases accessible by the plurality of ECUs, the plurality of CAN databases storing CAN message information such that each CAN database stores a unique configuration of the CAN message information, can include program instructions causing one or more of the plurality of ECUs: establish a plurality of periodic intervals during which each ECU performs CAN communication based upon the uniquely configured CAN message information stored in a particular CAN database among the plurality of CAN databases; and when a subsequent interval among the plurality of periodic intervals begins: receive a plurality of measurement values deriving from a plurality of sensors equipped in the vehicle, calculate a database reference number based upon the plurality of measurement values, the database reference number newly identifying a particular CAN database among the plurality of CAN databases, and perform CAN communication based upon the uniquely configured CAN message information stored in the newly identified CAN database.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 2 is a diagram illustrating an exemplary simplified version of CAN message information stored in CAN databases;

Figure 1:
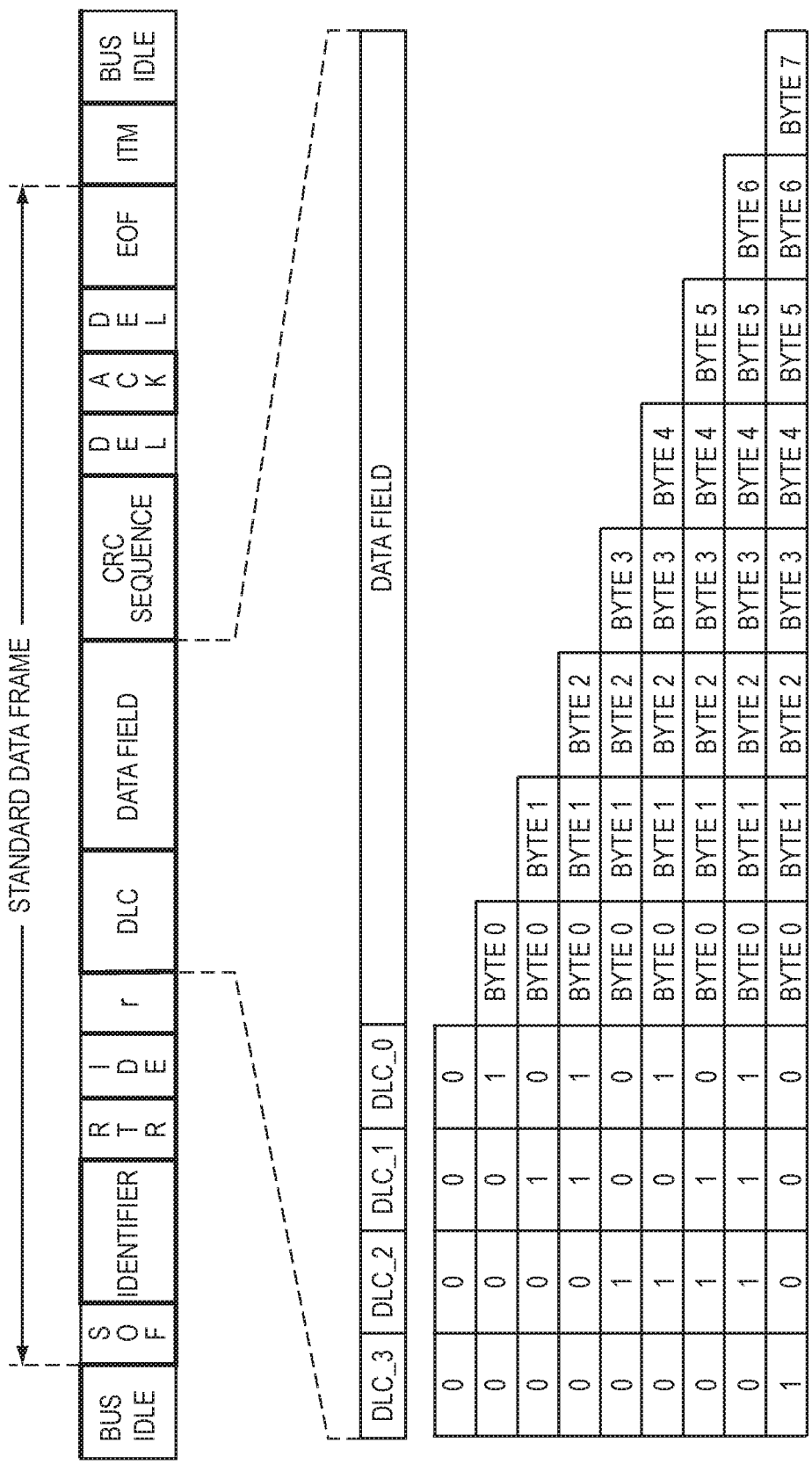
FIG. 1 is a diagram illustrating a conventional CAN data frame.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. The described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, includes hybrid vehicles, electric vehicles, plug-in hybrid electric vehicles, hydrogen-powered vehicles and other alternative fuel vehicles (e.g., fuels derived from resources other than petroleum), and further includes other "vehicles" such as trains, construction equipment, drones, spacecraft, and any other suitable example thereof. As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit (or electronic control unit (ECU)). The at least one control unit or ECU may be implemented in a vehicle, as described herein. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a controller area network (CAN). The computer network may refer to a local network, a remote network (e.g., the cloud), or any suitable combination or variation thereof.

Referring now to embodiments of the present disclosure, the vehicle CAN may include a plurality of ECUs. Each ECU can be responsible for controlling certain components or functions of the vehicle. As an example, the CAN may include a first ECU to control operations of the vehicle climate controls. The CAN may also include a second ECU to control operations of a vehicle cluster. The CAN may also include a third ECU to operations of a vehicle infotainment system (e.g., audio-video-navigation (AVN) device). Each of the three ECUs can communicate with each other within the CAN over a CAN bus. It should be understood that this example is non-limiting and provided for demonstration purposes only.

The ECUs may utilize information stored in a CAN database for performing communication with each other in the CAN. For example, one or more CAN databases accessible by the ECUs can store CAN message information that provides an indication of how an ECU which receives an incoming CAN data frame should interpret the received information. The CAN message information can also be referred to as a CAN message reference.

In further detail, FIG. 2 is a diagram illustrating an exemplary simplified version of CAN message information 100 stored in CAN databases 110. As shown in FIG. 2, each of the plurality of CAN databases 110 (i.e., CAN Database 1 and CAN Database 2) can store the same CAN message information 100. However, the CAN message information 100 as stored in the CAN databases 110 can include a unique identification scheme for identifying the data field inputs. Thus, each CAN database 110 can store a unique configuration of the same CAN message information 100.

According to the example illustrated in FIG. 2, each table of CAN message information (i.e., CAN message reference), as stored in the two CAN databases 110, contains three input data fields: speed, temperature, and engine temperature. Information stored in the data code length (DLC) field and payload byte fields for each of the three input data fields can be consistent across both CAN databases 110, but the identifiers (IDs) for the three input data fields can be unique across the CAN databases 110.

For instance, according to the CAN message information 100 stored in CAN Database 1, the input data field "Speed" corresponds to ID 100, the input data field "Temperature" corresponds to ID 101, and the input data field "Engine Temperature" corresponds to ID 102. Conversely, according to the CAN message information 100 stored in CAN Database 2, the input data field "Speed" corresponds to ID 102, the input data field "Temperature" corresponds to ID 100, and the input data field "Engine Temperature" corresponds to ID 101. Thus, each of the CAN message information 100 respectively stored in the CAN databases 110 can be uniquely configured via a unique identification scheme of a plurality of data fields of a CAN message (e.g., speed, temperature, engine temperature, etc.). It should be understood that this example is non-limiting and provided for demonstration purposes only.

The ECUs 120 can utilize the CAN message information 100 stored in a particular CAN database 110 for communicating with each other. Specifically, the ECUs 120 can refer to the IDs for each input data field, as shown in FIG. 2, to interpret CAN data received through the CAN bus 150 from another ECU.

Problematically, if a hacker obtains the CAN message information 100 being used as a reference by the ECUs 120, the hacker may be capable of decoding intercepted data. To protect against such an intrusion, it is contemplated that the ECUs 120 can utilize a shifting CAN message reference by changing the CAN database 110 in which to access CAN message information 100 on a periodic basis, so that a hacker is unable to know which stored CAN message information 100 is being used by the ECUs at a given time. More particularly, since the message IDs are changed across the CAN databases 110, a hacker may not be able to ascertain the correct IDs needed to decode data being transmitted across the CAN bus 150. This can cause the hacker to miscalculate the data byte length, resulting in an incorrect start of next frame, which further prevents the CAN messages from being surreptitiously decoded.

Figure 3:
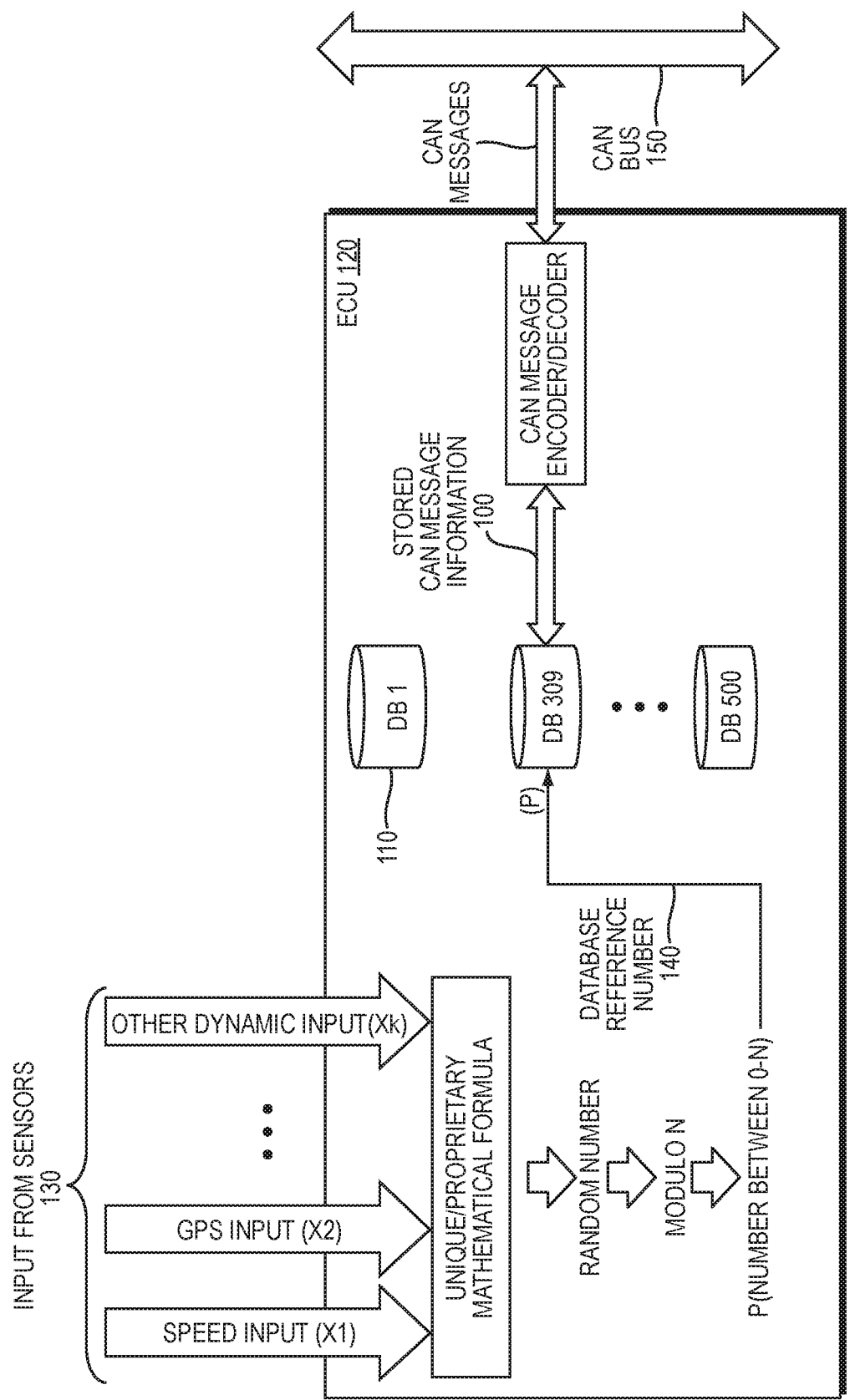
FIG. 3 is a flow chart illustrating an exemplary simplified procedure for controlling CAN communication using a shifting CAN message reference.

In this regard, FIG. 3 illustrates an exemplary simplified procedure for controlling CAN communication using a shifting CAN message reference. As shown in FIG. 3, one or more ECUs 120 in the CAN may calculate a changing database reference number 140 that identifies a particular CAN database 110. The ECUs 120 can then access the CAN message information 100 stored in the identified CAN database 110, uniquely configured in the manner shown in FIG. 2, and use the CAN message information 100 for performing communication in the CAN.

Firstly, an ECU 120 can receive a plurality of measurement values deriving from a plurality of sensors 130 equipped in the vehicle. (It is noted that the following steps can be performed by a single ECU 120 or a plurality of ECUs 120.) The ECU 120 can communicate with any amount or type of sensors 130 in the vehicle, and likewise, the ECU 120 can receive any amount or type of measurement inputs from the sensors 130 such as, for instance, vehicle speed, engine revolutions per minute (RPM), vehicle odometer, cabin temperature, blower fan speed, windshield wiper speed, radio volume level, current radio frequency, user destination, and so forth.

Next, the ECU 120 can use these measurement inputs to calculate a database reference number 140 that identifies a particular CAN database 110 among the plurality of CAN databases. The ECU 120 can calculate the database reference number 140 in various ways. In one example, the ECU 120 can calculate the database reference number 140 using an equation with the measurement inputs received from the plurality of sensors 130 and one or more random numbers as parameters. The result of the calculation can be applied to a modulo (MOD) of N, where N is the total number of CAN databases 110 in the CAN.

As an example, an equation such as Equation 1, shown below, can be used by the ECU 120 to calculate the database reference number 140.

$$P=((x1*R1+x2*R2+x3*R3+x4*R4)) \text{MOD } N \quad \text{Equation 1}$$

With respect to Equation 1, P can be the database reference number 140, x1, x2, x3, and x4 can represent measurement values received from four sensors 130 equipped in the vehicle, respectively, R1, R2, R3, and R4 can represent four distinct random numbers, respectively, and N can represent the total number of CAN databases 110.

As another example, an equation such as Equation 2, shown below, can be used by the ECU 120 to calculate the database reference number 140.

$$P=(R*(x1+x2+x3+x4)) \text{MOD } N \quad \text{Equation 2}$$

With respect to Equation 2, P can be the database reference number 140, x1, x2, x3, and x4 can represent measurement values received from four sensors 130 equipped in the vehicle, respectively, R can represent a random number, and N can represent the total number of CAN databases 110.

Any suitable equation, such as those above, which accepts as parameters one or more random numbers and the measurement inputs received from the sensors 130, can be used to calculate the database reference number 140. The formula for calculating the database reference number 140 can be adjusted to match a desired level of complexity. Thus, it should be understood that the above equations are non-limiting and provided for demonstration purposes only.

According to the example illustrated in FIG. 3, the total number of CAN databases 110 in the CAN is 500, and the database reference number 140 calculated using an equation as described above equals 309. As such, the CAN database 110 indexed as 309 among the 500 total CAN databases 110 can be used by the ECUs 120 as a reference for performing CAN communication. That is, the ECUs 120 can access the uniquely configured CAN message information 100 stored in the CAN database #309, and use that CAN message information 100 for communicating with each other across the CAN bus 150.

Continuing in this hypothetical example, a first ECU 120 can transmit a message (i.e., CAN data frame) indicating a tail light status to other ECUs 120 in the CAN. The first ECU 120 can encode the message based upon the uniquely configured CAN message information 100 stored in the CAN database #309. A second ECU 120 can then receive the encoded message transmitted from the first ECU 120. The second ECU 120 can decode the message, or determine the contents thereof, using the same uniquely configured CAN message information 100 stored in the CAN database #309. It should be understood that this example is non-limiting and provided for demonstration purposes only.

The ECU 120 (or plurality of ECUs) can calculate a new database reference number 140 on a periodic basis such that any potential hackers may be prevented from knowing the CAN database 110 being used by the ECUs 120 for CAN communication at any given time. To this end, the ECU 120 can establish a plurality of periodic intervals during which each ECU 120 performs CAN communication based upon the uniquely configured CAN message information stored in a particular CAN database 110. Whenever a subsequent or new interval among the plurality of periodic intervals begins, the database reference number 140 can be re-calculated by the ECU 120, or put another way, a new database reference number 140 can be calculated by the ECU 120. Upon such calculation the ECUs 120 can perform CAN communication based upon the uniquely configured CAN message information 100 stored in the newly identified CAN database 110. Example processes for establishing the plurality of periodic intervals are described in greater detail below.

Figure 4:
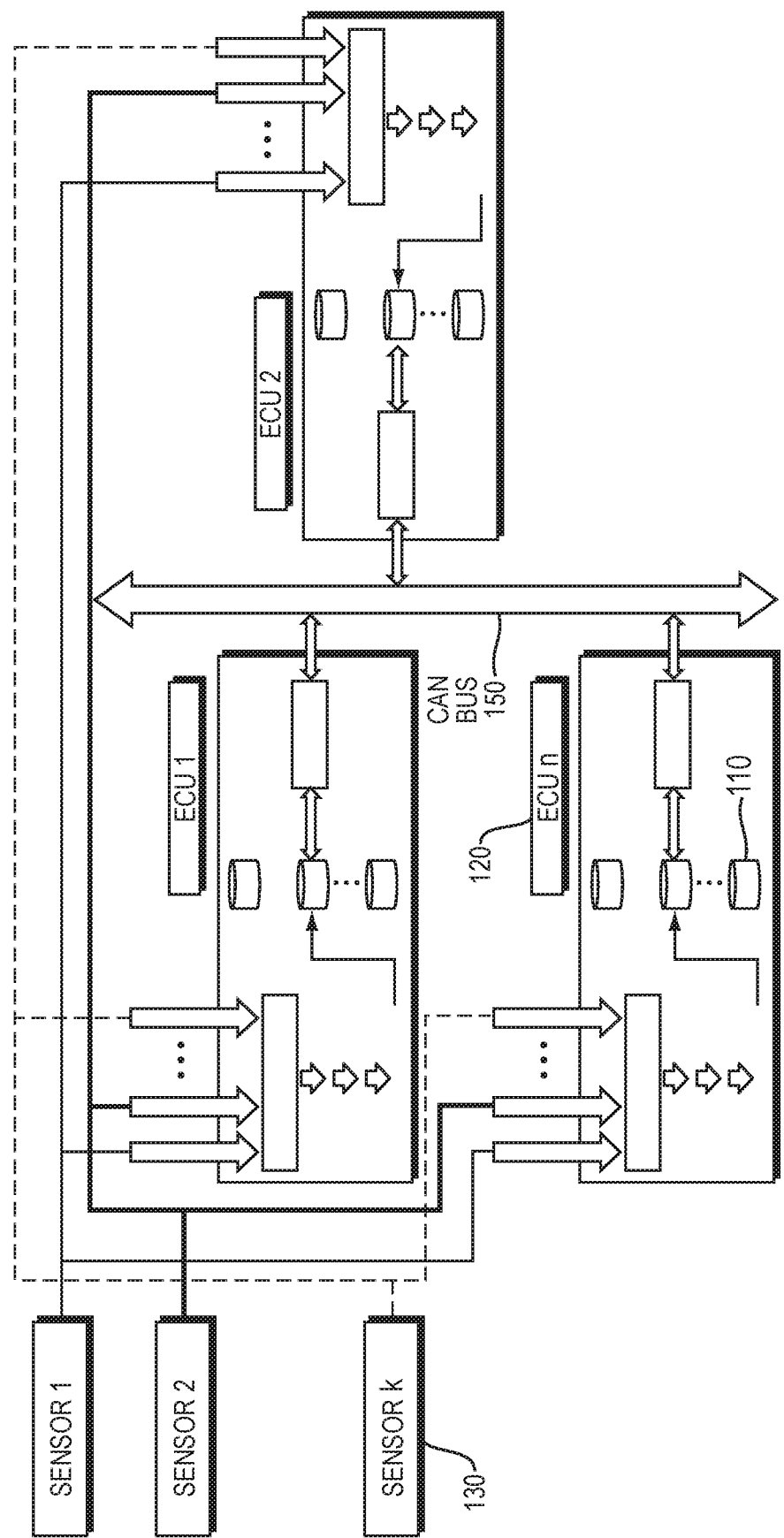
FIG. 4 is a diagram illustrating an exemplary mode of operation for controlling CAN communication using the shifting CAN message reference.

The methods for controlling CAN communication using a shifting CAN message reference, as described herein, can be implemented using a variety of operation modes. For example, FIG. 4 is a diagram illustrating a first exemplary mode of operation for controlling CAN communication using the shifting CAN message reference. In the first exemplary mode of operation, a particular group of sensors 130 (e.g., Sensor 1, Sensor 2, . . . Sensor k) can provide common measurement values to each ECU 120 (e.g., ECU 1, ECU 2, . . . ECU n), as shown in FIG. 4. That is, all ECUs 120 can receive the same measurement inputs from the plurality of sensors 130.

In this exemplary mode of operation, each ECU 120 can independently calculate the database reference number 140 using the same equation, such as either of the example equations described above, with common measurement inputs provided to all ECUs 120. As a result, each ECU 120 can derive the same database reference number 140, allowing all ECUs 120 in the CAN to retrieve the same uniquely configured CAN message information 100 that is stored in the CAN database 110 corresponding to the database reference number 140. The ECUs 120 can then communicate with each other via the CAN bus 150 based upon the CAN message information 100.

As mentioned above, the ECUs 120 can calculate a new database reference number 140 on a periodic basis so as to shift the CAN message reference and thus deter hackers from decoding any intercepted messages. In this exemplary mode of operation, a plurality of periodic intervals during which each ECU 120 performs CAN communication based upon the uniquely configured CAN message information 100 stored in a particular CAN database 110 can be established according to a common time set by a time-keeping device equipped in the vehicle, such as an internal clock, a global positioning system (GPS) device, or the like. Thus, when a subsequent interval begins according to the common time set by the time-keeping device, the ECUs 120 can calculate a new database reference number 140. Upon such calculation the ECUs 120 can perform CAN communication based upon the uniquely configured CAN message information 100 stored in the CAN database 110 newly identified by the database reference number 140.

In a second exemplary mode of operation, a master-slave relationship can be established among the plurality of ECUs 120. Particularly, a given ECU 120 among the plurality of ECUs 120 in the CAN may be designated as a master ECU. The master ECU can be responsible for controlling one or more operations of the method for controlling CAN communication. Meanwhile, the remaining ECUs 120 can operate as slave ECUs.

In this exemplary mode of operation, all ECUs 120 can receive the same measurement inputs from the plurality of sensors 130, similar to the example illustrated in FIG. 4. Using the received sensor inputs, each ECU 120 can independently calculate the database reference number 140 with the same equation, such as either of the example equations described above. As a result, each ECU 120 can derive the same database reference number 140, allowing all ECUs 120 in the CAN to retrieve the same uniquely configured CAN message information 100 that is stored in the CAN database 110 corresponding to the database reference number 140. The ECUs 120 can then communicate with each other via the CAN bus 150 based upon the CAN message information 100.

In contrast with the first exemplary mode of operation, the second exemplary mode of operation involves the master ECU establishing the plurality of periodic intervals during which each ECU 120 performs CAN communication based upon the uniquely configured CAN message information 100 stored in a particular CAN database 110. For instance, the master ECU can define a plurality of database reference number calculation times, at each of which a new database reference number 140 must be calculated. In one example, the master ECU can define the database reference number calculation times according to fixed intervals (e.g., every 15 seconds, every 30 seconds, etc.) or any other suitable metric.

Then, the master ECU can transmit the defined plurality of database reference number calculation times to the slave ECUs. Once the slave ECUs have received the plurality of database reference number calculation times set by the master ECU, and a subsequent database reference number calculation time begins, the slave ECUs can calculate a new database reference number 140. (The master ECU can perform the calculation, as well.) Upon such calculation all ECUs 120 can perform CAN communication based upon the uniquely configured CAN message information 100 stored in the CAN database 110 newly identified by the database reference number 140.

In a third exemplary mode of operation, a master-slave relationship can again be established among the plurality of ECUs 120. Particularly, a given ECU 120 among the plurality of ECUs 120 in the CAN may be designated as a master ECU. The master ECU can be responsible for controlling one or more operations of the method for controlling CAN communication. Meanwhile, the remaining ECUs 120 can operate as slave ECUs.

In contrast with the first and second modes of operation, only the master ECU can receive the measurement inputs from the plurality of sensors 130. Using the received sensor inputs, the master ECU can calculate the database reference number 140 using an equation such as either of the example equations described above. In this case, the slave ECUs may not calculate the database reference number 140, and as a result, the calculations are limited to a single ECU (i.e., the master). Alternatively, the master ECU can transmit the measurement inputs to the slave ECUs, and the slave ECUs can also calculate the database reference number 140 using the measurement inputs received from the master ECU.

After calculating the database reference number 140, the master ECU can send the calculated database reference number 140 to the slave ECUs. This can allow all ECUs 120 to retrieve the same uniquely configured CAN message information 100 that is stored in the CAN database 110 corresponding to the database reference number 140. The ECUs 120 can then communicate with each other via the CAN bus 150 based upon the CAN message information 100.

Similar to the second exemplary mode of operation, the third exemplary mode of operation involves the master ECU establishing the plurality of periodic intervals during which each ECU 120 performs CAN communication based upon the uniquely configured CAN message information 100 stored in a particular CAN database 110. For instance, the master ECU can define a plurality of database reference number calculation times, at each of which a new database reference number 140 must be calculated. In one example, the master ECU can define the database reference number calculation times according to fixed intervals (e.g., every 15 seconds, every 30 seconds, etc.) or any other suitable metric.

Once a subsequent database reference number calculation time begins according to the master ECU's defined intervals, the master ECU can calculate a new database reference number 140, and transmit the same to the slave ECUs. All ECUs 120 can then perform CAN communication based upon the uniquely configured CAN message information 100 stored in the CAN database 110 newly identified by the database reference number 140.

In a fourth exemplary mode of operation, a rotating master-slave relationship can be established among the plurality of ECUs 120. That is, a given ECU 120 among the plurality of ECUs 120 in the CAN may be designated as a master ECU, in the same manner as described above, and new master ECUs can be designated at predefined times. The current master ECU can be responsible for designating a subsequent master ECU. Meanwhile, the remaining ECUs 120 can operate as slave ECUs.

Figure 5:
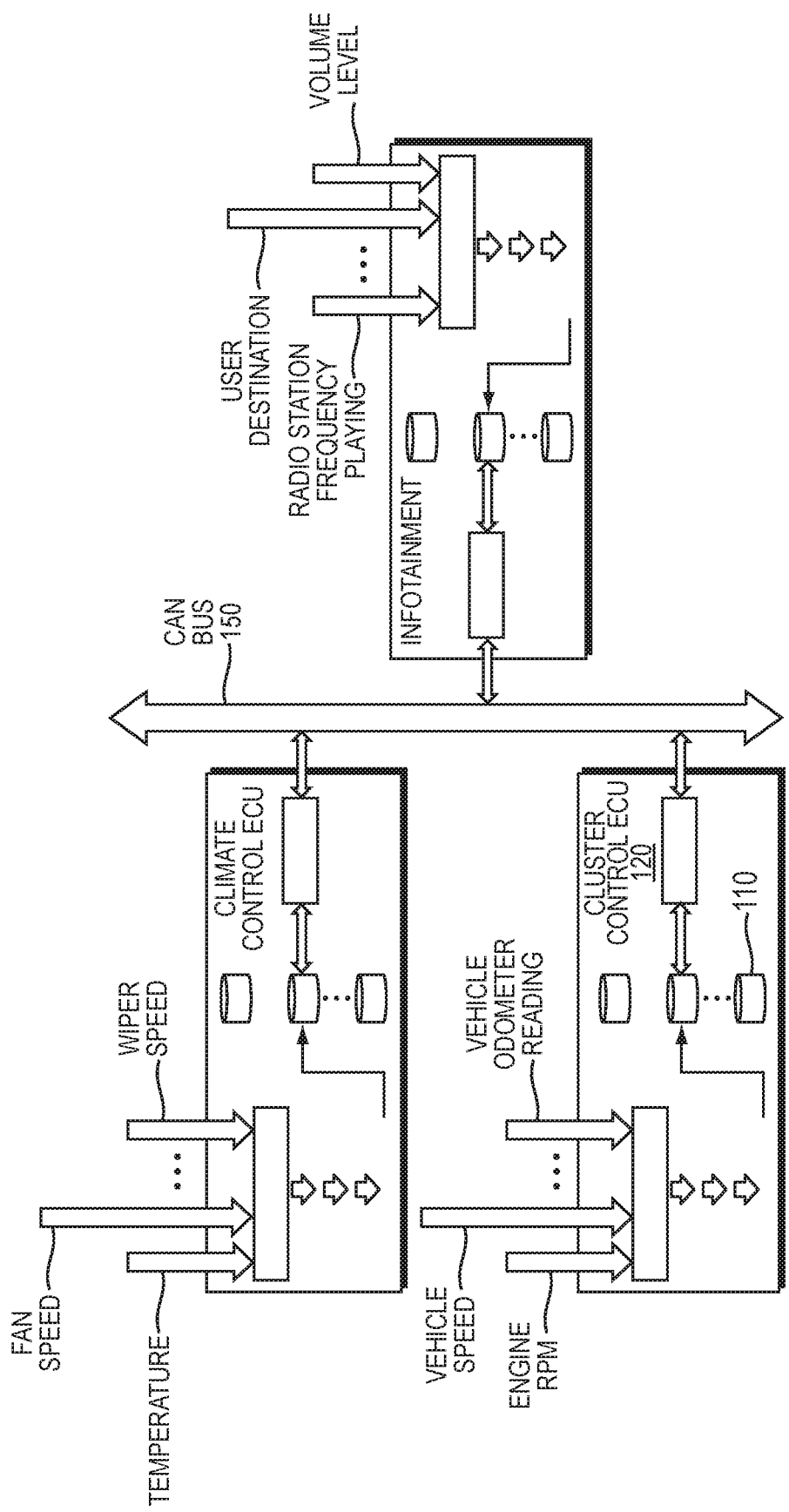
FIG. 5 is a diagram illustrating another exemplary mode of operation for controlling CAN communication using the shifting CAN message reference.

FIG. 5 is a diagram illustrating the fourth exemplary mode of operation for controlling CAN communication using the shifting CAN message reference. In contrast with the first, second, and third modes of operation, each ECU 120 can receive a plurality of measurement values deriving from a different group of sensors 130 respectively controlled by each ECU 120, as shown in FIG. 5. For instance, a climate control ECU can receive measurement values from sensors within the climate control system relating to cabin temperature, blower fan speed, and windshield wiper speed, a cluster control ECU can receive measurement values from sensors within the cluster system relating to engine RPM, vehicle speed, and the vehicle odometer, and an infotainment ECU can receive measurement values from sensors within the infotainment system relating to a radio station frequency, a user destination, and a radio volume level. As a result, each ECU 120 receives a unique grouping of measurement values.

Using the received sensor inputs, only the presently acting master ECU can calculate the database reference number 140 using an equation such as either of the example equations described above. In this case, the slave ECUs may not calculate the database reference number 140, and as a result, the calculations are limited to a single ECU (i.e., the ECU presently acting as master).

After calculating the database reference number 140, the master ECU can send the calculated database reference number 140 to the slave ECUs. This can allow all ECUs 120 to retrieve the same uniquely configured CAN message information 100 that is stored in the CAN database 110 corresponding to the database reference number 140. The ECUs 120 can then communicate with each other via the CAN bus 150 based upon the CAN message information 100.

In the fourth exemplary mode of operation, the master ECU can establish the plurality of periodic intervals during which each ECU 120 performs CAN communication based upon the uniquely configured CAN message information 100 stored in a particular CAN database 110. For instance, the master ECU can define a plurality of database reference number calculation times, at each of which a new database reference number 140 must be calculated. In one example, the master ECU can define the database reference number calculation times according to fixed intervals (e.g., every 15 seconds, every 30 seconds, etc.) or any other suitable metric.

Once a subsequent database reference number calculation time begins according to the master ECU's defined intervals, the master ECU can calculate a new database reference number 140, and transmit the same to the slave ECUs. All ECUs 120 can then perform CAN communication based upon the uniquely configured CAN message information 100 stored in the CAN database 110 newly identified by the database reference number 140.

Moreover, as mentioned above, the master ECU can designate a new master ECU at predefined times according to fixed intervals (e.g., every 15 seconds, every 30 seconds, etc.) or any other suitable metric. Upon designating a new master ECU, the current master ECU can send a message to the new master ECU notifying of the master designation. The new master ECU can then be responsible for performing the functions listed above.

It should be understood that all of the exemplary modes of operation described above are non-limiting and provided for demonstration purposes only. Additional modes of operation are possible, and the modes of operation described above can be modified in any suitable manner in accordance with the present claims.

Accordingly, systems and methods are described herein for controlling CAN communication in a vehicle using a shifting CAN message reference that can enhance the security of communications between ECUs over the CAN bus. Because the formulae for calculating the database reference number are unknown to outside entities, it can be difficult for potential hackers to determine the CAN database being referenced by the ECUs. Moreover, the use of physical run time input from vehicle sensors can provide additional unpredictability to the CAN database switching logic to further thwart intrusions. In the event of a hacker attempting to inject harmful messages into the CAN, it can be detected by any ECU once the reference database changes since the hacker cannot predict the reference database change, and will be injecting old reference messages as a result. Also, even when a system is compromised (e.g., a hacker discovers all databases used in the CAN), a system breach can be detected faster because of the reference database switch, and a prevention mechanism can be promptly triggered.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for controlling controller area network (CAN) communication in a vehicle including a plurality of electronic control units (ECUs) and a plurality of CAN databases accessible by the plurality of ECUs, the method comprising:
   storing CAN message information in the plurality of CAN databases such that each CAN database stores a unique configuration of the CAN message information;
   establishing, by one or more of the plurality of ECUs, a plurality of periodic intervals during which each ECU performs CAN communication based upon the uniquely configured CAN message information stored in a particular CAN database among the plurality of CAN databases; wherein the particular CAN database is identified by a database reference number;
   when a subsequent interval among the plurality of periodic intervals begins:
   receiving a plurality of measurement values deriving from a plurality of sensors equipped in the vehicle,
   calculating a new database reference number by using the plurality of measurement values and one or more random numbers, the new database reference number newly identifying a particular CAN database among the plurality of CAN databases, and
   performing CAN communication, by each ECU, based upon the uniquely configured CAN message information stored in the newly identified CAN database.

2. The method of claim 1, further comprising:
   designating a particular ECU among the plurality of ECUs as a master ECU to control one or more operations of the method for controlling CAN communication,
   wherein the remaining ECUs operate as slave ECUs.

3. The method of claim 2, wherein the establishing of the plurality of periodic intervals comprises:
   defining, by the master ECU, a plurality of database reference number calculation times.

4. The method of claim 3, further comprising:
   receiving, at the slave ECUs, the defined plurality of database reference number calculation times from the master ECU; and
   when a subsequent database reference number calculation time among the defined plurality of database reference number calculation times begins, calculating, by the slave ECUs, the database reference number based upon the plurality of measurement values.

5. The method of claim 2, wherein the receiving of the plurality of measurement values comprises:
   receiving, at the master ECU only, the plurality of measurement values deriving from the plurality of sensors equipped in the vehicle.

6. The method of claim 5, further comprising:
   receiving, at the slave ECUs, the plurality of measurement values from the master ECU; and
   calculating, by the slave ECUs, the database reference number based upon the received plurality of measurement values.

7. The method of claim 2, wherein the calculating of the database reference number comprises:
   calculating, by the master ECU only, the database reference number based upon the plurality of measurement values.

8. The method of claim 7, further comprising:
   receiving, at the slave ECUs, the calculated database reference number from the master ECU; and performing CAN communication, by each ECU, based upon the uniquely configured CAN message information stored in the CAN database newly identified by the received database reference number.

9. The method of claim 2, wherein the receiving of the plurality of measurement values comprises:
receiving, at each ECU, a plurality of measurement values deriving from a plurality of sensors respectively controlled by each ECU such that each ECU receives a unique grouping of measurement values;
calculating, by the master ECU only, the database reference number based upon the plurality of measurement values received by the master ECU;
transmitting, by the master ECU, the calculated database reference number to the slave ECUs; and
performing CAN communication, by each ECU, based upon the uniquely configured CAN message information stored in the CAN database newly identified by the transmitted database reference number.

10. The method of claim 2, further comprising:
designating, by the master ECU, a particular ECU among the plurality of ECUs as a new master ECU to control one or more operations of the method for controlling CAN communication.

11. The method of claim 1, wherein the receiving of the plurality of measurement values comprises:
receiving, at each ECU, the plurality of measurement values deriving from the plurality of sensors equipped in the vehicle such that each ECU receives a common grouping of measurement values.

12. The method of claim 1, wherein the calculating of the database reference number comprises:
calculating, by each ECU, the database reference number based upon the plurality of measurement values.

13. The method of claim 1, wherein the database reference number is a randomly calculated number based on the plurality of measurement values.

14. The method of claim 1, wherein the establishing of the plurality of periodic intervals comprises:
establishing the plurality of periodic intervals according to a common time set by a time-keeping device equipped in the vehicle.

15. The method of claim 1, wherein the performing of CAN communication comprises:
receiving, at an ECU among the plurality of ECUs, a CAN message via a CAN bus; and
determining, by the ECU, content of the CAN message based upon the uniquely configured CAN message information stored in the newly identified CAN database.

16. The method of claim 1, wherein each unique configuration of the CAN message information includes a unique identification scheme of a plurality of data fields of a CAN message.

17. A system for controlling controller area network (CAN) communication in a vehicle, the system comprising:
a plurality of electronic control units (ECUs) equipped in the vehicle;
a plurality of CAN databases configured to store CAN message information such that each CAN database stores a unique configuration of the CAN message information;
a plurality of sensors equipped in the vehicle communicatively coupled to the plurality of ECUs;
and a CAN bus through which the plurality of ECUs perform CAN communication,
wherein one or more of the plurality of ECUs is configured to establish a plurality of periodic intervals during which each ECU performs CAN communication based upon the uniquely configured CAN message information stored in a particular CAN database among the plurality of CAN databases, wherein the particular CAN database is identified by a database reference number;
and when a subsequent interval among the plurality of periodic intervals begins:
receive a plurality of measurement values deriving from the plurality of sensors, calculate a new database reference number using the plurality of measurement values and one or more random numbers as parameters, the new database reference number newly identifying a particular CAN database among the plurality of CAN databases, and
perform CAN communication based upon the uniquely configured CAN message information stored in the newly identified CAN database.

18. A non-transitory computer readable medium containing program instructions for controlling controller area network (CAN) communication in a vehicle including a plurality of electronic control units (ECUs) and a plurality of CAN databases accessible by the plurality of ECUs, wherein the plurality of CAN databases store CAN message information such that each CAN database stores a unique configuration of the CAN message information, the program instructions when executed by one or more of the plurality of ECUs causing the one or more ECUs to:
establish a plurality of periodic intervals during which each ECU performs CAN communication based upon the uniquely configured CAN message information stored in a particular CAN database among the plurality of CAN databases; wherein the particular CAN database is identified by a database reference number; and
when a subsequent interval among the plurality of periodic intervals begins:
receive a plurality of measurement values deriving from a plurality of sensors equipped in the vehicle, calculate a new database reference number using the plurality of measurement values and one or more random numbers as parameters, the new database reference number newly identifying a particular CAN database among the plurality of CAN databases, and perform CAN communication based upon the uniquely configured CAN message information stored in the newly identified CAN database.

* * * * *